Figure 1:
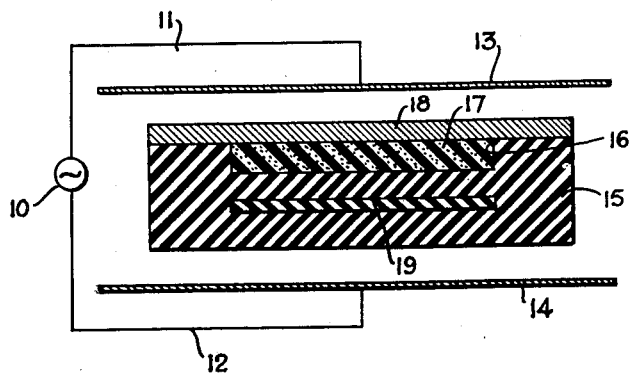

Jan. 27, 1953  G. P. BOSOMWORTH  2,626,428
HEAT TRANSFER CORRECTOR FOR ELECTRONIC MOLDS
Filed Oct. 8, 1948  2 SHEETS—SHEET 1

Inventor
GEORGE P. BOSOMWORTH
By Ely & Frye
Attorneys

Jan. 27, 1953  G. P. BOSOMWORTH  2,626,428
HEAT TRANSFER CORRECTOR FOR ELECTRONIC MOLDS
Filed Oct. 8, 1948  2 SHEETS—SHEET 2

INVENTOR.
GEORGE P. BOSOMWORTH
BY Ely & Frye
ATTORNEYS

Patented Jan. 27, 1953

2,626,428

UNITED STATES PATENT OFFICE 2,626,428

HEAT TRANSFER CORRECTOR FOR ELECTRONIC MOLDS

George P. Bosomworth, Akron, Ohio, assignor to The Firestone Tire & Rubber Company, Akron, Ohio, a corporation of Ohio Application October 8, 1948, Serial No. 53,510

12 Claims. (Cl. 18—38)

This invention relates to the art of fabricating or treating rubber materials with high frequency electrical energy, and more specifically to the type of molds used therewith when vulcanizing said rubber materials.

The introduction of the step of treatment by high frequency electrical energy in the manufacture of rubber articles fabricated from compositions of rubber or rubber-like materials, such as natural rubber latex, artificial aqueous dispersions of natural or reclaimed rubber, latices or water dispersions of butadiene-styrene, butadiene-acrylonitrile, isoprene-styrene, or neoprene (polychloroprene) type synthetic rubbers has given rise to new problems in the selection of suitable mold material having at the same time the proper dielectric characteristics and physical properties. It is desirable that the curing be accomplished in the mold in which the dispersion or composition is poured and gelled because removal from the original mold after gelling, but before vulcanization, usually results in deformation or damage to the molded article.

In the past it has been common practice to use metal molds for manufacturing such articles. The molds having substantial components of conducting material so arranged as to present a low impedance path cannot be used where the mold must be placed in the high frequency electrical field because such a mold would effect a short circuit of the high frequency energy. Therefore it is necessary that the mold, being made mainly of a dielectric material, must also have other necessary characteristics as outlined below.

It is important that the mold material be selected with consideration given to the so-called "dielectric loss factor." This factor should match as closely as is practical "loss factor" of the material subjected to the high frequency energy. Under this condition heating of the work material will approximately equal heating of the mold as the result of the high frequency current, with the desirable result that heat flow therebetween is maintained at a minimum.

Many materials having apparently desirable properties including ordinary glass, wood and porcelain have been tried. Also, various plastics have been used in the fabrication of this type of mold but none of these materials is considered commercially satisfactory for large quantity production. Ordinary glass and porcelain, for example, are too heavy and fragile for the molding of large articles in large numbers. The dielectric loss factor of some of the synthetic plastics is too large and they therefore become heated too readily when they are subjected to the high frequency electrical field. Wood, even when coated with ordinary coating materials, absorbs moisture to such an extent that arcing is induced between the electrodes over or through the mold and the molded material.

In a copending application of Mason and Bosomworth, Serial No. 19,386, filed April 6, 1948, various mold materials are described which remedy the defects noted above. Such mold materials include wood, or fiber glass, rayon, nylon or cotton fibers impregnated with a synthetic resinous material. As a preferred form, the said application proposes a mold of rubber material, preferably with a minimum of filler. In certain cases an unloaded rubber presents difficulties relating to heat generation and heat transfer, and it is an object of this invention to overcome such difficulties.

As pointed out in the above co-pending application, Serial No. 19,386, it is desirable to match, as far as possible, loss factor of the mold material with the loss factor of the material to be cured. If the material to be cured has an unusually high loss factor, the normal practice heretofore has been to employ a mold of material having an equally high loss factor. There is an upper loss factor limit for mold material beyond which the molds cannot be economically employed due to rapid deterioration or disintegration during use. Heretofore the mold materials employed to present an unusually high loss factor have been uniformly loaded with carbon black or its equivalent to give the desired result. It has been found that the same effect may be obtained without the attendant rapid deterioration of the mold through employment of a mold material normally presenting a substantially lower loss factor than that presented by the material to be cured, but heavily loaded, at pre-selected areas throughout the mold, with carbon black or its equivalent in a manner whereby the mold presents the desired over-all loss factor and consequently a temperature variation corresponding to the temperature variation resulting from the dielectric heating of the material contained therein.

It has been further found that objects having a thickness which varies transversely of the mold achieve a non-uniform cure due to the varying values of mass emitting heat through unit surface. It is therefore still another object of the invention to provide for a uniform cure in articles of varying thickness by varying the mass of that region of the mold having an adjusted loss factor in accordance with the thickness of the adjacent part of the article to be cured.

The foregoing and other objects are attained by the present invention, certain embodiments of which are described in the accompanying specification and illustrated in the drawings, in which:

Fig. 1 is an elevational section through a schematized mold; and

Figure 2:
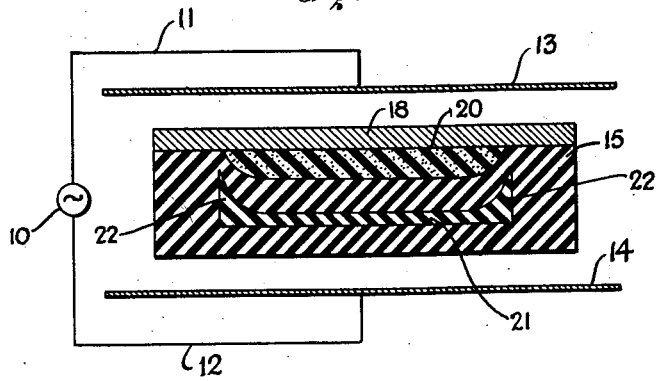
Figure 3:
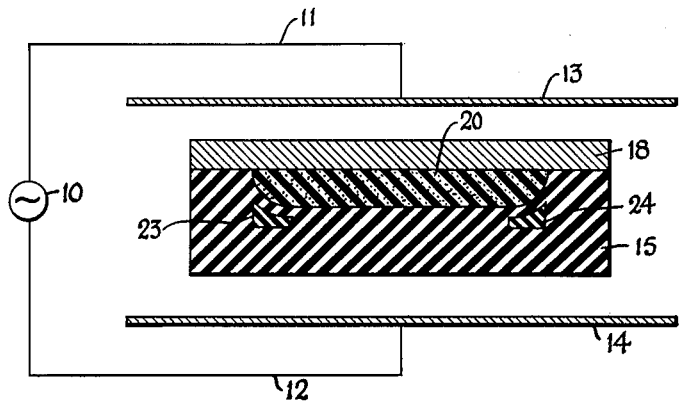
Figure 4:
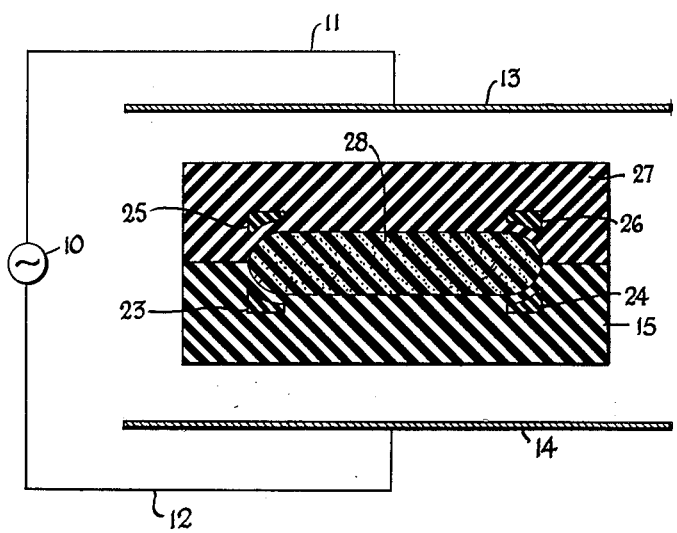

Figs. 2, 3, and 4 are views similar to Fig. 1 showing modifications.

In order to emphasize the points of novelty in the invention, particulars of the mold structure have been omitted in the drawings. Such details are familiar to those skilled in the art and furthermore are shown in the above-mentioned copending application to which reference is also made in these particulars.

A source of alternating E. M. F. is indicated at 10, with leads 11, 12 connecting with electrodes 13, 14, respectively. A mold 15 of rubber-like material, such as a pure gum, vulcanized stock, has a well 16 of shape corresponding to the article to be cured, 17, indicated as composed of sponge rubber. A cover plate 18, preferably of aluminum, is placed over the article 17.

Under the influence of the high voltage, rapidly alternating field, the molecular agitation in the article 17 results in a steady generation of heat which effects the cure of the article.

The mold 15 having a relatively small loss factor will not heat up as rapidly as the curing article and will therefore absorb heat therefrom. This can be corrected by loading the mold with a filler such as carbon black, but if the filler is dispersed throughout the entire mold the latter will suffer a loss in its thermal and electrical insulating properties and in physical strength. Therefore the loading is accomplished in a relatively small central region of the mold. In this region the loading may be accomplished to any desired concentration within the confines of a given volume to effect the proper heat generation. Preferably such a region of loaded stock will be attained by placing, in the mold material, an insert 19 obtained from a separately milled stock. A slight amount of pre-cure on the insert will aid in ensuring its correct location in the mold during the manipulations prior to final cure of the mold, although such pre-cure is not strictly necessary.

Using a mold as shown, the insert 19 constitutes a separate source of heat energy and acts as a heat guard by heating the rubber mold and thus preventing heat losses from the article 17 thereinto, and since the heat-generating portion is centrally of the mold and occupies but a small volume, the over-all durability of the mold is maintained and its insulating properties are retained throughout a major portion thereof.

In Fig. 2 is shown a modification designed to compensate for varying thickness of the article under cure. Here, the article 20 partakes of a shape not uncommon in the field of sponge rubber goods, with a uniform thickness throughout the major extent thereof and generally curved end faces presenting a thickness diminishing to zero value. It will be seen that through any given extent of area of the face of the article in contact with the cover plate 18, the temperature drop will be greater as the amount of material behind the area diminishes; that is to say, as the thickness decreases. The heat generated per cubic inch is the same throughout the article under cure, but the ratio of radiating surface to available heat will increase with diminishing thickness of the article with resulting lower temperatures in the regions of lesser thickness. It follows, therefore, that with uniform conditions of heat generation per unit mass the value of the temperature along the article will occur in direct relation to the thickness and the end portions of the article will emerge from the mold in a state of varying undercure, assuming that the portion of maximum thickness has attained optimum cure.

In order to compensate for this situation there is provided a region of inserted material which provides an augmented generation of heat in the mold according to a pattern dictated by the configuration of the article under cure. As shown in Fig. 2, this is accomplished by varying the sectional profile of the insert 21 as shown at the ends 22 in inverse order of the variation in thickness of the article 20. Here the extra mass of loaded stock in the insert provides an increased quantity of heat generated which becomes available to maintain the temperature along the article 20 at or near a constant value throughout the length thereof. Not only is the mass of loaded stock increased in areas considered but at the same time the proximity of the boundary of the insert with the lower boundary of the article is maintained.

While the insert has been shown as varying in sectional profile with homogeneous loading, a somewhat similar result may be obtained by an insert of constant profile, but in which the concentration of filler loading is varied in inverse relation to the thickness of the article cured.

Although the insert in the Fig. 2 modification is shown as extending throughout the length of the curing area, it will be understood that the inserts may be provided only in the regions of varying thickness, since it is possible in some cases that the region of normal cure will not require a heat assister in the mold. This is illustrated in Fig. 3 wherein the filler-loaded inserts 23 and 24 are employed only adjacent the tapering ends of the mold cavity.

In Fig. 4 is shown an arrangement wherein an upper mold section 27 is employed in conjunction with lower section 15 to produce a symmetrically convex article 28, inserts 25 and 26 of filler-loaded stock being located in the upper mold section similarly to inserts 23 and 24 in the lower mold section, and for the same purpose.

Although the compensation has been shown as applied in connection with an article of varying thickness, the invention will have useful application in the adjustment of heat supply for any article whatever having varying rates of heat emission throughout its emission surfaces.

Also, whereas the insert has been described as comprising a loaded rubber stock, other suitable inserts affording a high value of heat generation may be employed, the principal consideration being that the insert be located as a core in the mold in order to provide for auxiliary heating without affecting the over-all endurance and insulating properties of the mold.

While a mold has been described as having the outer portion of pure gum rubber, the invention also contemplates the case where some amount of filler may be present therein consistent with durability and insulating power, the important feature being that the heaviest concentration of heat inducing material be located in the interior.

I am aware metal particles have been employed in articles to be cured, but these are designed for a single subjection to the high-frequency field and have been homogeneously dispersed throughout the article. Successive curing, in these cases, will result in rapid deterioration of the article.

Obviously, departures may be made from the details, proportions and materials shown in the foregoing description of my invention without departing from the spirit or scope thereof.

What is claimed is:

1. A mold for containing and forming rubber or rubber-like articles while said articles are being treated by high-frequency electrical energy, said mold comprising an outer portion of substantially pure gum rubber and an isolated inner component of rubber containing a filler, said inner component adapted for heat generation when the mold is exposed to an alternating electric field.

2. A mold for containing and forming rubber or rubber-like articles while said articles are being treated by high-frequency electrical energy, said mold comprising an outer portion of substantially pure gum rubber and an isolated inner component of rubber containing carbon black, said inner component adapted for heat generation when the mold is exposed to an alternating electric field.

3. A mold for containing and forming rubber or rubber-like articles while said articles are being treated by high-frequency electrical energy, said mold having a molding cavity of varying depth and comprising an outer portion of substantially pure gum rubber and an isolated inner component of rubber containing carbon black, said inner component adapted for heat generation when the mold is exposed to an alternating electric field and said inner component varying in thickness in inverse relation to the depth of the adjacent portion of the mold cavity.

4. A mold for containing and forming rubber or rubber-like articles while said articles are being treated by high-frequency electrical energy, said mold having a molding cavity of varying depth and comprising an outer portion of substantially pure gum rubber and an isolated inner component of rubber containing carbon black present in an amount in inverse relation to the depth of the adjacent portion of the mold cavity, said inner component adapted for heat generation when the mold is exposed to an alternating electric field.

5. A mold for containing and forming rubber or rubber-like articles while said articles are being treated by high-frequency electrical energy, said mold having a cavity of tapering ends, and comprising an outer portion of dielectric material and isolated inserts of dielectric material internally of the mold and adjacent the said tapering ends, said inserts having a thickness varying inversely with the depth in the said tapering ends, having a dielectric loss factor in excess of that of the said outer portion, and adapted for heat generation when the mold is exposed to an alternating electric field.

6. A mold for containing and forming rubber or rubber-like articles while said articles are being treated by high-frequency electrical energy said mold comprising separable portions each having a cavity tapering at its ends and each comprising an outer portion of dielectric material and isolated inserts of dielectric material adjacent the said tapering ends and of a thickness varying inversely with the depth in the said tapering ends and having a dielectric loss factor in excess of that of said outer portions, said inserts adapted for heat generation when the mold is exposed to an alternating electric field.

7. A mold for containing and forming articles of rubber or the like material for curing of said articles by high-frequency electrical energy, said mold comprising an outer component of dielectric material having a surface defining a molding cavity, and an inner component of dielectric material embedded within said outer component, so as to be completely surrounded by the material thereof so that structural breakdown of the inner component due to heating is not deleterious to the form of the outer component, said inner component adapted for heat generation when the mold is exposed to an alternating electrical field, and having a dielectric loss factor considerably greater than that of said outer component.

8. A mold for containing and forming articles of rubber or the like material for curing of said articles by high-frequency electrical energy, said mold comprising an outer component of dielectric material having a surface defining a molding cavity, and an inner component of dielectric material embedded within said outer component, so as to be completely surrounded by the material thereof so that structural breakdown of the inner component due to heating is not deleterious to the form of the outer component and having an overall volume small in comparison to that of said outer component, said inner component adapted for heat generation when the mold is exposed to an alternating electrical field, and having a dielectric loss factor considerably greater than that of said outer component.

9. A mold for containing and forming articles of rubber or the like material for curing of said articles by high-frequency electrical energy, said mold comprising an outer component of dielectric material having a surface defining a molding cavity, and an inner component of dielectric material embedded within said outer component, so as to be completely surrounded by the material thereof so that structural breakdown of the inner component due to heating is not deleterious to the form of the outer component and having an overall volume small in comparison to that of said outer component, and being substantially coextensive in area with the mold cavity, said inner component adapted for heat generation when the mold is exposed to an alternating electrical field, and having a dielectric loss factor considerably greater than that of said outer component.

10. A mold for containing and forming articles of rubber or the like material for curing of said articles by high-frequency electrical energy, said mold comprising an outer component of dielectric material having a surface defining a molding cavity of varying depth, and an inner component of dielectric material embedded within said outer component, so as to be completely surrounded by the material thereof so that structural breakdown of the inner component due to heating is not deleterious to the form of the outer component, said inner component adapted for heat generation when the mold is exposed to an alternating electrical field, and having a dielectric loss factor greater than that of said outer component, and constructed and arranged to provide a generation of heat of varying rate across the mold cavity in inverse relation to the depth of the mold cavity adjacent the respective portions of said inner component.

11. A mold for containing and forming articles of rubber or the like material for curing of said articles by high-frequency electrical energy, said mold comprising an outer component of dielectric material having a surface defining a molding cavity of varying depth, and an inner component of dielectric material isolated within said outer component, said inner component adapted for heat generation when the mold is exposed to an alternating electrical field, and having a dielectric loss factor greater than that of said outer component, and of a varying thickness inversely related to the depth of the adjacent portions of the molding cavity.

12. A mold for containing and forming articles of rubber or the like material for curing of said articles by high-frequency electrical energy, said mold comprising an outer component of dielectric material having a surface defining a molding cavity of varying depth, and an inner component of dielectric material embedded within said outer component, so as to be completely surrounded by the material thereof so that structural breakdown of the inner component due to heating is not deleterious to the form of the outer component, said inner component adapted for heat generation when the mold is exposed to an alternating electrical field, and having a dielectric loss factor greater than that of said outer component, and arranged to generate heat in a quantity which varies inversely as the depth of the adjacent portions of said molding cavity.

GEORGE P. BOSOMWORTH.

REFERENCES CITED

The following references are of record in the file of this patent:

UNITED STATES PATENTS

| Number | Name | Date |
|---|---|---|
| 2,187,260 | Brandenburg | Jan. 16, 1940 |
| 2,197,212 | Hagemeyer | Apr. 16, 1940 |
| 2,317,597 | Ford et al. | Apr. 27, 1943 |
| 2,341,617 | Hull | Feb. 15, 1944 |
| 2,421,099 | Vogt | May 27, 1947 |
| 2,438,952 | Te Grotenhuis | Apr. 6, 1948 |
| 2,460,242 | Renaud | Jan. 25, 1949 |